(12) United States Patent
Allan et al.

(10) Patent No.: US 7,580,996 B1
(45) Date of Patent: Aug. 25, 2009

(54) METHOD AND SYSTEM FOR DYNAMIC UPDATE OF AN APPLICATION MONITORING AGENT USING A NON-POLLING MECHANISM

(75) Inventors: Ron Campbell Allan, Austin, TX (US); Joseph Mulavelil George, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1168 days.

(21) Appl. No.: 09/583,958

(22) Filed: May 31, 2000

(51) Int. Cl.
*G06F 15/173* (2006.01)
(52) U.S. Cl. .................. 709/224; 719/317
(58) Field of Classification Search ............. 709/221, 709/224, 202, 226; 707/10; 370/255
See application file for complete search history.

(56) References Cited

U.S. PATENT DOCUMENTS

| | | | | |
|---|---|---|---|---|
| 5,619,716 | A | 4/1997 | Nonaka et al. | 395/800 |
| 5,732,275 | A | 3/1998 | Kullick et al. | 395/712 |
| 5,913,218 | A | 6/1999 | Carney et al. | 707/200 |
| 5,933,604 | A * | 8/1999 | Inakoshi | 709/226 |
| 5,946,464 | A * | 8/1999 | Kito et al. | 709/202 |
| 5,958,010 | A * | 9/1999 | Agarwal et al. | 709/224 |
| 6,009,274 | A | 12/1999 | Fletcher et al. | 395/712 |
| 6,029,196 | A | 2/2000 | Lenz | 709/221 |
| 6,137,782 | A * | 10/2000 | Sharon et al. | 370/255 |
| 6,308,208 | B1 * | 10/2001 | Jung et al. | 709/224 |
| 6,317,786 | B1 * | 11/2001 | Yamane et al. | 709/224 |

(Continued)

FOREIGN PATENT DOCUMENTS

EP      0864972 A1    9/1998

(Continued)

OTHER PUBLICATIONS

Menon et al., "Object Replacement using Dynamic Proxy Updates", Proceedings of Second International Workshop on Configurable Distributed Systems, Pittsburgh, Mar. 21, 1994.

(Continued)

*Primary Examiner*—Dustin Nguyen
(74) *Attorney, Agent, or Firm*—Yee & Associates, P.C.; Jeffrey S. LaBaw

(57) ABSTRACT

A method for updating operational parameters of a monitoring agent on a client in a distributed data processing system is presented. The monitoring agent filters the outgoing network data traffic from the client to a server and determines whether an outgoing transaction is addressed such that an application on the server receives the outgoing transaction as a request to change the operational parameters of the monitoring agent. The outgoing transaction is parsed for a destination address and matched with a destination address stored as an operational parameter of the monitoring agent on the client. The destination address may be a Uniform Resource Locator (URL) embedded within a Hypertext Transport Protocol (HTTP) request. In response to a positive determination, the monitoring agent then sends a request to the server to send to the monitoring agent an update of the operational parameters of the monitoring agent.

18 Claims, 6 Drawing Sheets

U.S. PATENT DOCUMENTS

| | | | |
|---|---|---|---|
| 6,405,250 B1 * | 6/2002 | Lin et al. | 709/224 |
| 6,496,858 B1 * | 12/2002 | Frailong et al. | 709/221 |
| 6,671,724 B1 * | 12/2003 | Pandya et al. | 709/226 |
| 6,714,976 B1 * | 3/2004 | Wilson et al. | 709/224 |
| 6,912,534 B2 * | 6/2005 | DeBettencourt et al. | 707/10 |

FOREIGN PATENT DOCUMENTS

| | | |
|---|---|---|
| JP | 10-320338 | 12/1998 |
| JP | 11-095989 | 4/1999 |

OTHER PUBLICATIONS

Kanitar et al., "Real-Time Client-Server Push Strategies: Specification and Evaluation", 4$^{th}$ Real-Time Technology and Applications Symposium (RTAS '98), Denver, Jun. 3, 1998.

"Application Monitoring File with Application Performance Monitoring Wrapper", IBM Technical Disclosure Bulletin, v. 39, n. 9, Sep. 1996.

* cited by examiner

```
# [CSClient]
#Wed Apr 26 11:37:35 PDT 2000
client.availability.policy.mgmtsrvid=39187e5127d315ed
client.availability.policy.mgmtsrvIP=255.17.23.31
client.availability.policy.mgmtsrvURL=http://www.tivoli.com/mgmtsrv/config/update.cgi
client.availability.policy.vcuploadON=00:00
client.availability.policy.vcuploadOFF=00:00
client.availability.mailPolicyVioBoilerPlate=Availability Agent Policy Violation
client.availability.policy.http.emailIncidentsTo=
client.availability.mailRecoveryReport=Availability Agent Recovery Report
client.availability.baseRsrcWaitInterval=3000
         .
         .
         .
client.availability.datasink.portnumber=8090
client.availability.mailErrorRecovBoilerPlate=Availability Agent Recovery Complete
client.availability.policy.dns.timeout=1500
client.availability.arm.filter.size=0
client.availability.mailPolicyVioSubject=Availability Agent Policy Violation
client.availability.datasink.TransRetry=5
client.availability.DebounceQueueLifeTime=900000
client.availability.datasink.prototimeout=5000
client.availability.policy.vcuploadfrequency=daily
client.availability.flashusertime=5000
client.availability.vsagent.filter.size=0
client.availability.baseRsrcWaitCount=5000
client.availability.policy.policyid=4
client.availability.policy.http.timeout=3000
client.availability.policy.SocksProxyPort=0
client.availability.policy.SocksProxyHost=
client.availability.datasink.ReconnectRetry=5
```

252 — client.availability.policy.mgmtsrvIP=255.17.23.31
254 — client.availability.policy.mgmtsrvURL=http://www.tivoli.com/mgmtsrv/config/update.cgi

METHOD AND SYSTEM FOR DYNAMIC UPDATE OF AN APPLICATION MONITORING AGENT USING A NON-POLLING MECHANISM

BACKGROUND OF THE INVENTION

1. Field of the Invention

This invention relates generally to an improved data processing system and, more particularly, to improved processing of a distributed data processing system. Still more particularly, this invention relates to a method, apparatus, system, or computer program product for monitoring a server using an agent on a client.

2. Description of Related Art

As the number of World Wide Web sites and the number of applications for the Internet continues to increase dramatically, the expectations of businesses and consumers with respect to the Internet become more demanding and sophisticated. Consumers expect businesses to provide quality service on their Web sites 24 hours a day, 7 days a week. Some business-to-consumer Web sites have suffered outages that became high-profile news events and generated significant consumer dissatisfaction. These businesses have responded by committing greater resources to the management of their information technology.

As the number of business-to-business ventures has increased, the repercussions for failing to meet a customer's expectations become more serious. Although a consumer-oriented business may have a general commitment to providing a high level of service, the business may not have a contractual agreement with its users to guarantee a particular level of performance or availability. However, business-to-business ventures are generally bound by contractual agreements, and as sophistication with networked systems has increased, a business may contractually guarantee its customers that an Internet application will perform to a specified quality of service. Otherwise, financial remedies may be invoked to recoup losses generated by the business's failure to deliver guaranteed quality of service. These types of arrangements place more pressure on the business's information technology management.

In order to determine the quality of service provided by an organization's data processing system at any given time, both system availability and system performance must be monitored. Although a system may be available such that transactions may be initiated and completed, the system should also deliver timely access. For example, the system should perform transactions within a short time period.

In response to this situation, some organizations have deployed enterprise-wide solutions that attempt to monitor information systems from within an organization's firewalls. While an organization may then have some level of confidence in its system's availability and performance, these types of solutions lack the fundamental ability to report the actual service received by a customer outside of the organization's own system.

As an alternative solution, an organization may deploy client machines at remote locations that mimic customer transactions. Agents on these client machines submit simulated transactions to the organization's servers across the Internet and then monitor the responses received from its servers. The system then periodically collects the client data from the remote locations for analysis. This solution has the advantage of allowing the organization to physically control the remote clients that generate the simulated transactions. This type of solution has been used so frequently that third-party vendors supply this type of quality of service monitoring by deploying and controlling the remote clients. The third-party can provide an independent, unbiased report of the quality of service delivered by the organization to client machines outside of the organization's immediate control. However, this type of solution still lacks the fundamental ability to report the actual service received by a customer. Since it is the customer to whom the organization guarantees a particular quality of service, a sophisticated customer may demand that a quality of service guarantee will be measured against the transactions actually generated by the customer.

As another solution, an organization may place a monitoring agent on each client machine that interacts with the organization's servers. The monitoring agent then monitors the Internet data traffic to and from the client machine. In particular, the monitoring agent watches for transactions that are initiated to the organization's servers. The completion and/or response time of those transactions are then logged by the monitoring agent and reported to the organization for analysis. While this type of solution provides the fundamental ability to report the actual service received by a customer's client machines, the monitoring agent is then outside of the organization's immediate control. The organization must then address the difficult task of placing, configuring, and updating the configuration of the monitoring agents or the policies used by the monitoring agents dispersed throughout the customer's system.

To address the task of updating the policy/configuration of the monitoring agents, the monitoring agents are generally required to poll the management server for policy/configuration updates at periodic intervals. If the policy/configuration updates are initiated centrally at the management server, then an infrequent polling period may be sufficient. For example, if the organization has a policy of centrally dispersing a configuration update, when necessary, only once a day at a particular time, then each client may poll the management server shortly thereafter the predetermined time to receive its configuration update.

However, a sophisticated quality of service system may allow a configuration or policy change to be initiated by a customer on a client machine. For example, with proper authorization, a customer's system administrator may use a configuration program on the client machine to initiate behavioral changes to the monitoring agent on the client machine. Typically, the service provided by the organization to its customers is delivered via the Internet using a browser-type application by the customer, and a browser-type application is also used by the system administrator to complete a configuration change form or a policy change form that is then sent across the Internet to the management server of the organization that is providing services to the customer. The management server then processes and stores the requested changes.

Since the monitoring agent is an independent application that is distinct from another program that initiates the policy changes, e.g., the monitoring agent is monitoring the availability and performance of a service accessed using a Web browser, the configuration or policy change is not initiated within the monitoring agent. The configuration or policy change is unknown to the monitoring agent until the monitoring agent polls the management server and receives any information necessary for its behavior.

In this situation, since the customer would expect that an update submitted from a client machine should be quickly reflected in the behavior of the monitoring agent on the client machine, the monitoring agent must frequently poll the management server in order to receive the update in a timely manner. For example, the monitoring agent may be required to poll the management server several times a minute. Depending upon the service offered and the relationship between the customer and the organization providing the service, frequent polling from many clients may be burdensome to the management server. However, the organization that operates the management server may have guaranteed a quality of service to a customer that is a large, multinational corporation with thousands of client machines accessing the provided service. From the organization's perspective, frequent polling from thousands of client machines may require several management servers dedicated to processing only polling requests. On the other hand, from the customer's perspective, frequent polling minimizes the time lag between policy or configuration changes and the behavior of the monitoring agent.

Therefore, it would be advantageous to provide a manner of updating a monitoring agent to receive policy or configuration changes without using a polling mechanism. It would be particularly advantageous to provide an update mechanism that minimizes the time lag between the initiation of the policy or configuration update and the receipt of the update by the monitoring agent.

SUMMARY OF THE INVENTION

The present invention is a method, system, apparatus, or computer program product for updating operational parameters of a monitoring agent on a client in a distributed data processing system. The monitoring agent monitors characteristics of at least one application executing on a server in the distributed data processing system. The monitoring agent filters the outgoing network data traffic from the client to the server. The monitoring agent then determines whether an outgoing transaction in the network data is addressed such that an application on the server receives the outgoing transaction as a request to change the operational parameters of the monitoring agent. In order to determine whether the outgoing transaction is a request to change the operational parameters of the monitoring agent, the outgoing transaction is parsed for a destination address and matched with a destination address stored as an operational parameter of the monitoring agent on the client. The destination address may be a Uniform Resource Locator (URL) embedded within a Hypertext Transport Protocol (HTTP) request. In response to a positive determination, the monitoring agent then sends a request to the server to send to the monitoring agent an update of the operational parameters of the monitoring agent. The monitoring agent receives and stores the update of the operational parameters of the monitoring agent.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2B is an example of a portion of a configuration/policy file that is used to control the behavior of an associated monitoring agent in accordance with a preferred embodiment of the present invention;

DETAILED DESCRIPTION OF THE INVENTION

Figure 1A:
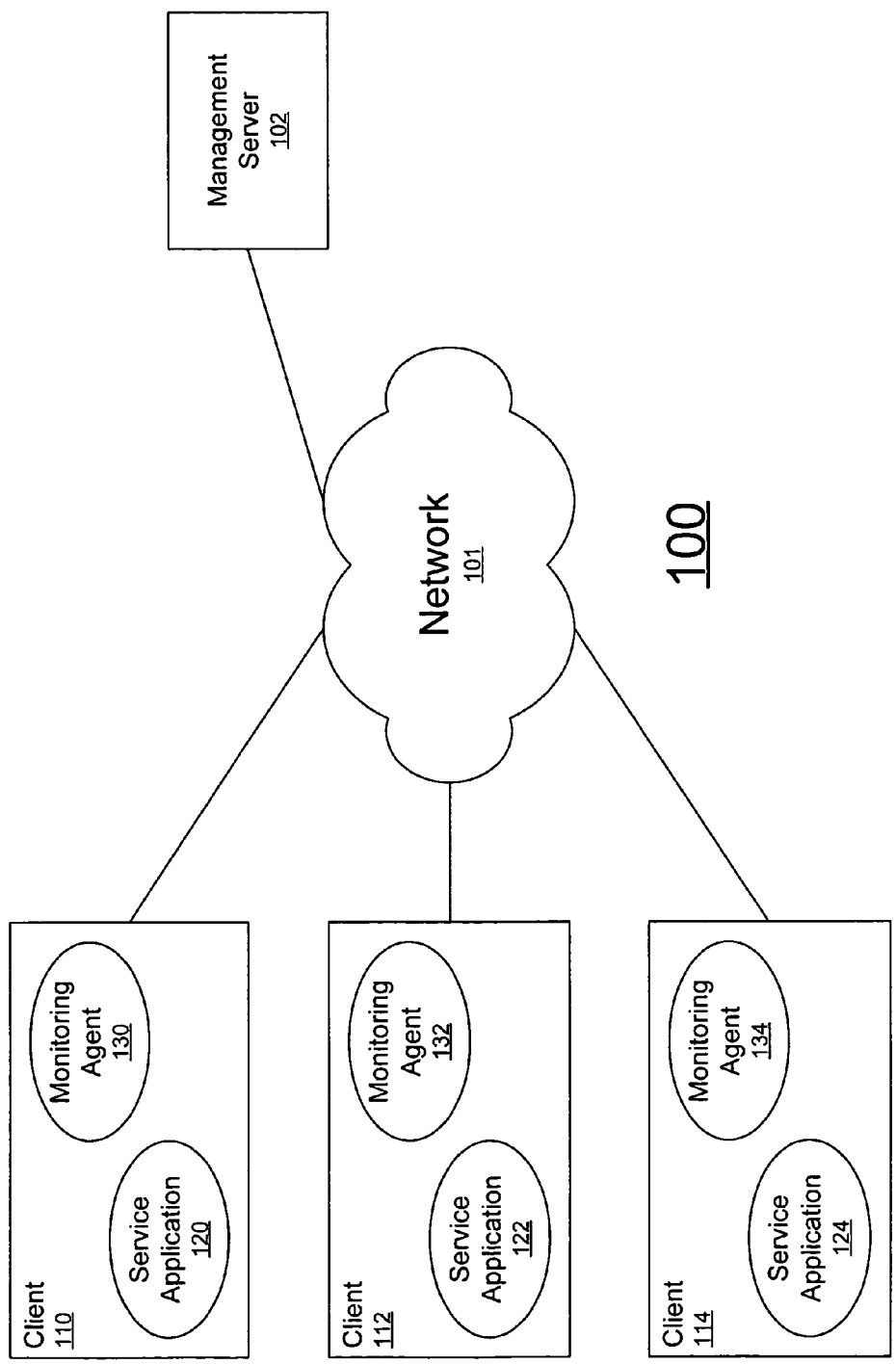
FIG. 1A depicts a distributed data processing system containing a typical service application and an associated monitoring agent.

With reference now to the figures, FIG. 1A depicts a distributed data processing system containing a typical service application and an associated monitoring agent. Distributed data processing system 100 contains network 101, which is the medium used to provide communications links between various devices and computers connected together within distributed data processing system 100. Network 101 may include permanent connections, such as wire or fiber optic cables, or temporary connections made through telephone connections. In the depicted example, distributed data processing system 100 includes the Internet with network 101 representing a worldwide collection of networks and gateways that use the TCP/IP suite of protocols to communicate with each another. At the heart of the Internet is a backbone of high-speed data communication lines between major nodes or host computers, consisting of thousands of commercial, government, educational and other computer systems that route data and messages. FIG. 1A is intended as an example and not as an architectural limitation for the present invention.

Management server 102 is connected to network 101, and clients 110-114 also are connected to network 101. Clients 110-114 may be, for example, personal computers or network computers. For purposes of this application, a network computer is any computer, coupled to a network, which receives a program or data from another computer coupled to the network. In the depicted example, server 102 may provide data and applications to clients 110-114. Distributed data processing system 100 may include additional servers, clients, and other devices not shown.

Service applications 120-124 are used to access a service provided by one or more management servers. For example, management server 102 may provide an information service to the client machines of subscribers for a service fee. Service applications 120-124 may be Web-enabled browsers that access the information service provided by management server 102 to retrieve information.

Monitoring agents 130-134 sniff the data traffic generated by and received at clients 110-114. Generally, an agent is a software application that is performing tasks for the benefit of another software application. In this context, the monitoring agent is performing a task on a client in order to supply client-derived data to an analytical application elsewhere within the distributed data processing system. More specifically, monitoring agents 130-134 monitor the performance and/or the availability of applications on management server 102 for the benefit of an analysis application residing on management server 102 or residing elsewhere within system 100. Although monitoring agents 130-134 may be placed on clients 110-114 specifically to monitor the availability and/or performance of management server 102 in responding to service requests initiated by service applications 120-124 to management server 102, monitoring agents 130-134 are able to filter all data traffic to and from their respective client machines, as explained in more detail further below.

Figure 1B:
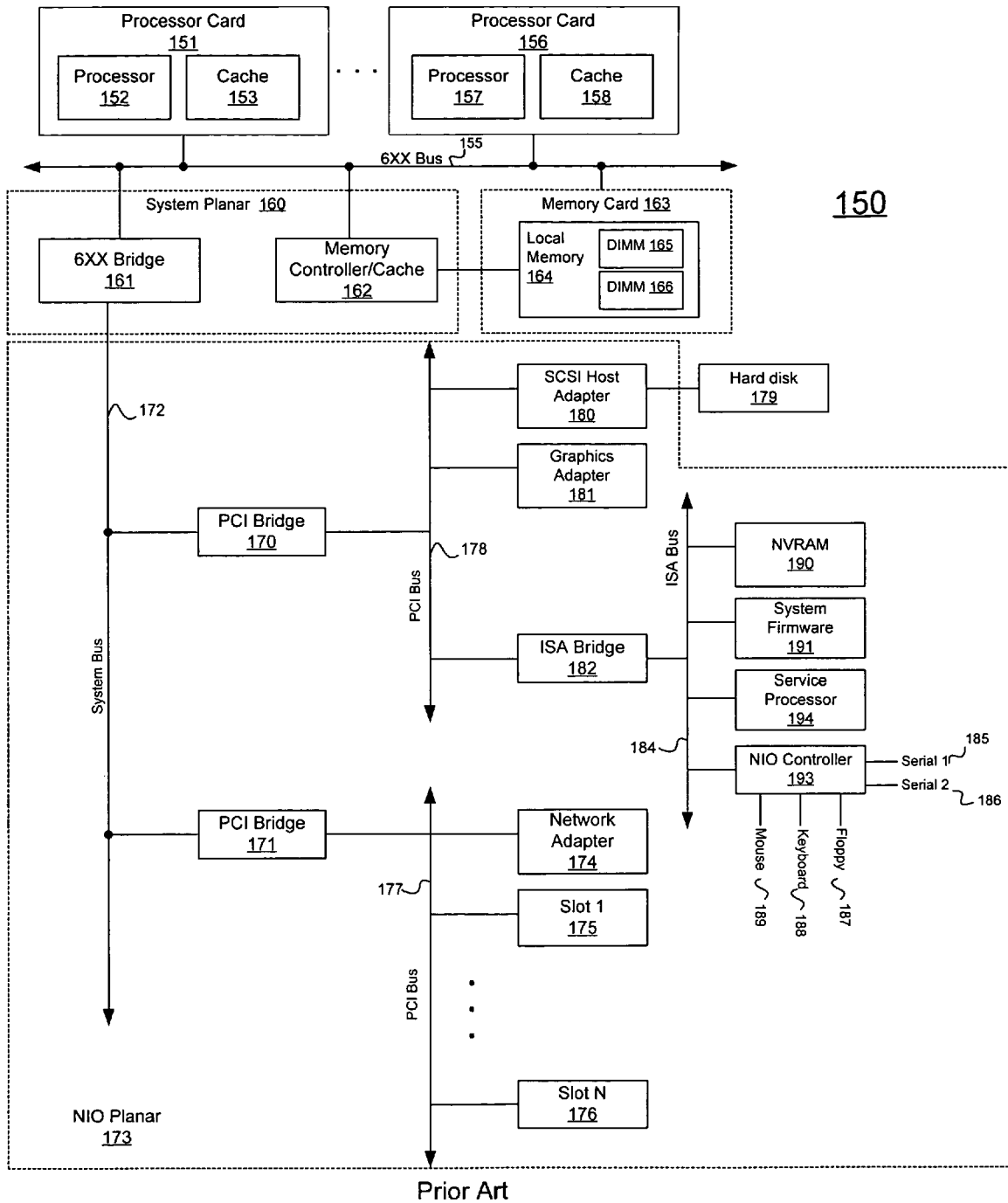
FIG. 1B depicts a typical computer architecture that may be used within a client or server as shown in FIG. 1A.

With reference now to FIG. 1B, a diagram depicts a typical computer architecture that may be used within a client or server, such as those shown in FIG. 1A. Data processing system 150 employs a variety of bus structures and protocols. Processor card 151 contains processor 152 and L2 cache 153 that are connected to 6XX bus 155. System 150 may contain a plurality of processor cards. Processor card 156 contains processor 157 and L2 cache 158.

6XX bus 155 supports system planar 160 that contains 6XX bridge 161 and memory controller 162 that supports memory card 163. Memory card 163 contains local memory 164 consisting of a plurality of dual in-line memory modules (DIMMs) 165 and 166.

6XX bridge 161 connects to PCI bridges 170 and 171 via system bus 172. PCI bridges 170 and 171 are contained on native I/O (NIO) planar 173 which supports a variety of I/O components and interfaces. PCI bridge 171 provides connections for external data streams through network adapter 174 and a number of card slots 175-176 via PCI bus 177. PCI bridge 170 connects a variety of I/O devices via PCI bus 178. Hard disk 179 may be connected to SCSI host adapter 180, which is connected to PCI bus 178. Graphics adapter 181 may also be connected to PCI bus 178 as depicted, either directly or indirectly.

ISA bridge 182 connects to PCI bridge 170 via PCI bus 178. ISA bridge 182 provides interconnection capabilities through NIO controller 193 via ISA bus 184, such as serial connections 185 and 186. Floppy drive connection 187 provides removable storage. Keyboard connection 188 and mouse connection 189 allow data processing system 150 to accept input data from a user.

Non-volatile RAM (NVRAM) 190 provides non-volatile memory for preserving certain types of data from system disruptions or system failures, such as power supply problems. System firmware 191 is also connected to ISA bus 184 and controls the initial BIOS. Service processor 194 is connected to ISA bus 184 and provides functionality for system diagnostics or system servicing.

Those of ordinary skill in the art will appreciate that the hardware in FIG. 1B may vary depending on the system implementation. For example, the system may have more or fewer processors, and other peripheral devices may be used in addition to or in place of the hardware depicted in FIG. 1B. The depicted examples are not meant to imply architectural limitations with respect to the present invention.

Figure 2A:
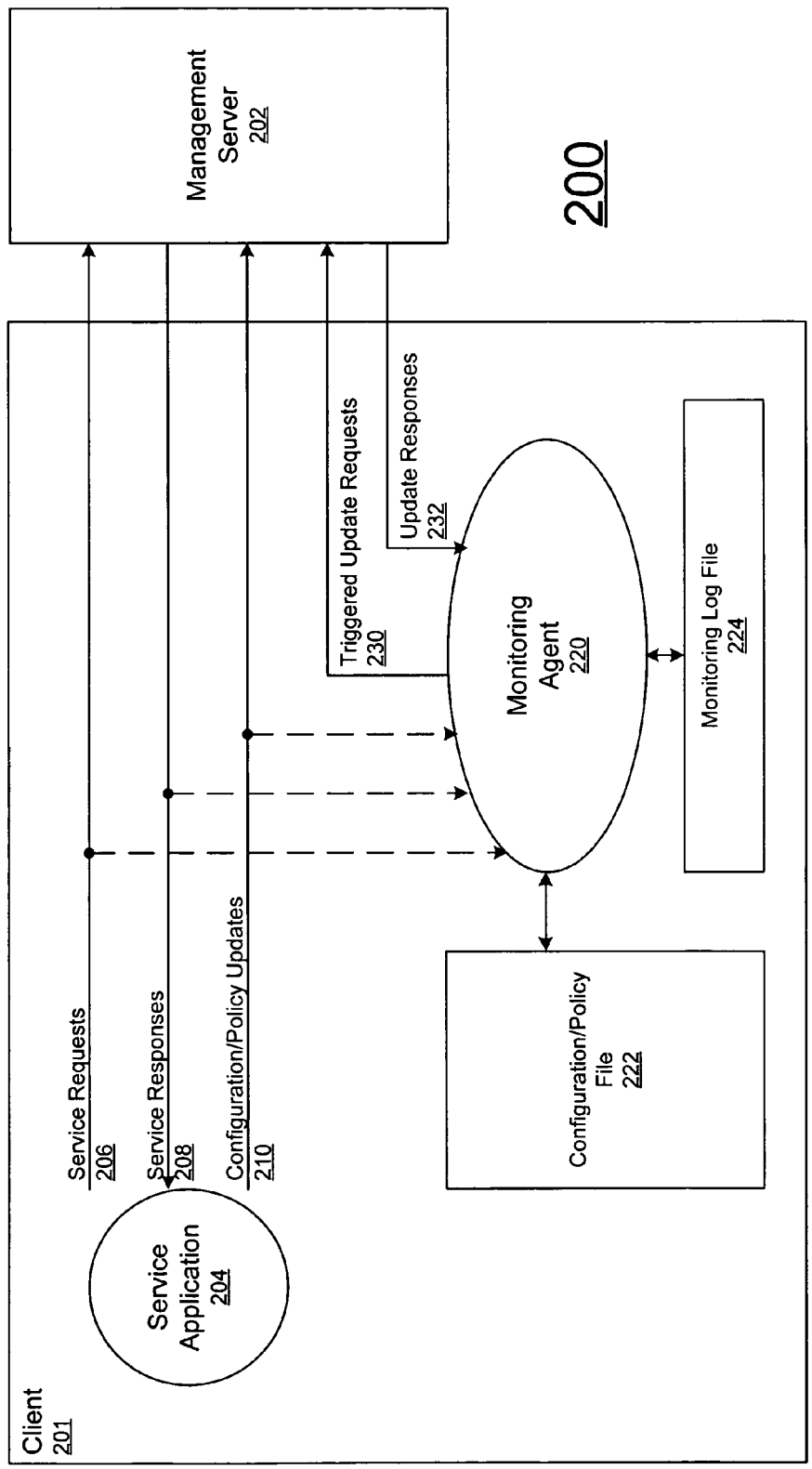
FIG. 2A is a block diagram depicting the data traffic in a distributed data processing system containing a service application and an associated monitoring agent in accordance with a preferred embodiment of the present invention.

With reference now to FIG. 2A, a block diagram depicts the data traffic in a distributed data processing system containing a service application and an associated monitoring agent in accordance with a preferred embodiment of the present invention. In a manner similar to that shown in FIG. 1A, distributed data processing system 200 contains management server 202 that communicates with client 201 to provide an electronic service by sharing information across a network. Service application 204 sends service requests 206 to management server 202, and in response, management server 202 sends service responses 208 to service application 204. Typically, service requests 206 are in the form of Hypertext Transport Protocol (HTTP) or Hypertext Transport Protocol Secure (HTTPS) GET methods, and service responses 208 are HTTP or HTTPS responses.

Service application 204 may also send configuration/policy updates 210 to management server 202. Typically, configuration/policy updates 210 are in the form of HTTP or HTTPS POST methods. As is well known in the art, the POST method differs from the GET method in that all parameter information in a POST is stored in the body of the request rather than in the Uniform Resource Locator (URL) portion of the method statement. Unlike the GET method, there is usually no way for a user to issue a POST by altering or entering a URL in a browser application. A POST is typically generated by the browser in response to the user clicking a "submit" button on a Hypertext Markup Language (HTML) form that utilizes the POST method.

Monitoring agent 220 sniffs all data traffic generated by and received at client 201, including configuration/policy update requests 210. The data traffic is scanned for specific types of information as specified by configuration/policy file 222. Protocol stack sniffers that are able to filter network traffic are well known in the art. Monitoring agent 220 may employ a protocol stack sniffer to examine the client's outgoing data traffic and monitor for specific events as previously specified in the configuration/policy file. The result of the monitoring agent's analysis is stored into or appended to monitoring log 224 as necessary. Monitoring log 224 may be sent (not shown) by monitoring agent 220 to management server 202 on a scheduled basis. The monitoring logs from various clients may be analyzed at management server 202 to determine the availability and/or response characteristics of management server 202 in providing an electronic service to a customer that uses the various client machines to access the electronic service.

Client 201 may have multiple installed service applications that provide a variety of services to users of client 201. In the preferred embodiment, monitoring agent 220 interacts, is associated with, or reports to a single management server that may provide a variety of information services.

Configuration/policy file 222 contains various parameter values that specify the operational/behavioral characteristics of monitoring agent 220. As is known in the art, these parameters may specify time values for timing the response characteristics of management server 202 so that an analysis may be made on the performance of management server 202 in responding to transactions or requests by client 201. In addition, these parameters may determine the filtering and logging operations to be performed by monitoring agent 220 while monitoring and reporting the results of filtering the outgoing data traffic of client 201.

In the prior art, a monitoring agent on a client would poll its management server by sending periodic configuration/policy update requests to the management server. In response, the management server would send configuration/policy update responses to the monitoring agent, which would store the updates in its associated configuration/policy file.

In the present invention, monitoring agent 220 further examines the outgoing network data for specific Uniform Resource Identifiers (URIs) or IP addresses that were previously specified and stored within configuration/policy file 222. These specified URIs or IP addresses identify a management server for which the monitoring agent is performing its monitoring actions. Rather than using the prior art polling mechanism to request configuration/policy updates, in the present invention, monitoring agent 220 uses a triggering mechanism to request configuration/policy updates. The identification within the client's outgoing network traffic of previously specified URIs or IP addresses, as stored within configuration/policy file 222, provides the triggering mechanism. Monitoring agent 220 sends triggered configuration/policy update requests 230 to management server 202. In response, management server 202 sends configuration/policy update responses 232 to monitoring agent 220, which stores the updates in configuration/policy file 222. The triggering mechanism used by monitoring agent 220 is described in more detail with respect to FIG. 3 and FIG. 4.

With reference now to FIG. 2B, a figure depicts an example of a portion of a configuration/policy file that is used to control the behavior of an associated monitoring agent in accordance with a preferred embodiment of the present invention. Configuration/policy file 250 contains IP address 252 and URI 254 for the management server of the monitoring agent associated with configuration/policy file 250. Other IP addresses or URIs to be monitored may also be specified with the configuration/policy file. When the monitoring agent detects outgoing network traffic addressed to IP address 252 or URI 254, the monitoring agent is triggered to send a configuration/policy update request to the management server.

Typically, the changes in the configuration/policy behavior of the monitoring agent are not automatic, and a user is required to initiate changes in the configuration/policy. For example, a user on the client may change a value within the configuration/policy file that specifies a maximum time interval for the client to wait for a response to an information resource request from the management server. The change may be effected in a variety of manners, such as through a special, privileged, password-protected Web page accessible within a browser-type service application. The user may desire to change the timing threshold because the client is receiving too many timing violations, which may be caused by a specific network topology or various network conditions that are independent of the speed with which the management server responds to requests from the client's service application.

After the user specifies the new value to be used by the monitoring agent, the new value is placed in a properly formatted configuration/policy change request and transmitted to the management server. The monitoring agent detects the data traffic addressed to an IP address or URI as specified in the configuration/policy file, and in response, the monitoring agent sends a configuration/policy update request to the management server.

Figure 3:
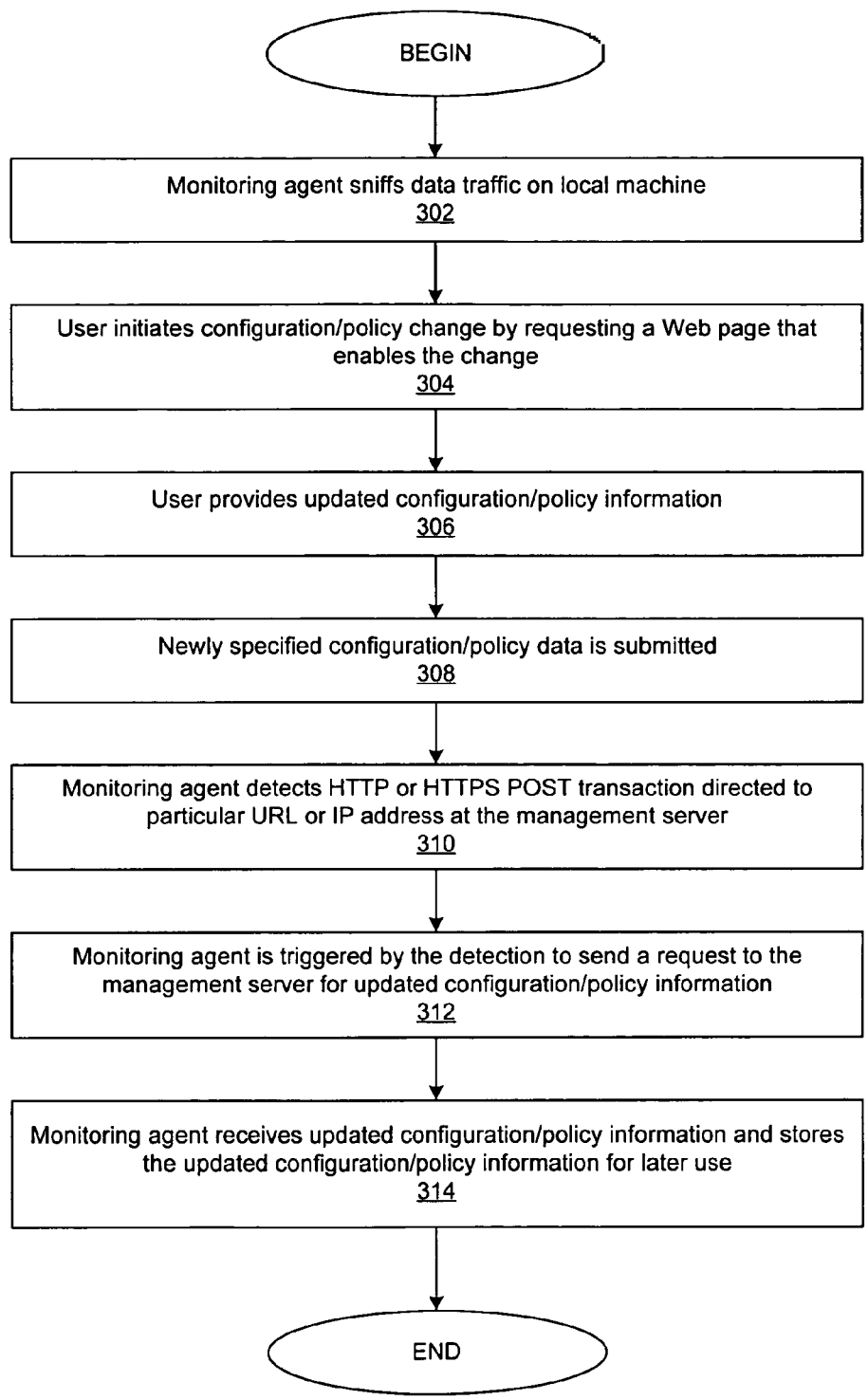
FIG. 3 is a flowchart depicting an overview of a process within a client for triggering configuration/policy update requests from a monitoring agent to a management server in accordance with a preferred embodiment of the present invention.

With reference now to FIG. 3, a flowchart depicts an overview of a process within a client for triggering configuration/policy update requests from a monitoring agent to a management server in accordance with a preferred embodiment of the present invention. As the process begins, the monitoring agent is already monitoring the data traffic of the local machine (step 302). At some point, a user initiates a configuration/policy change by requesting, from the management server, a Web page that enables the change (step 304). The user provides the updated configuration/policy information (step 306), and the newly specified configuration/policy data is submitted (step 308), possibly by submitting an HTML form to the management server. The monitoring agent detects the HTTP or HTTPS POST transaction directed to a particular URL, URI, or IP address at the management server (step 310).

In response to identifying a specific destination, the monitoring agent is then triggered to send a request to the management server for the updated configuration/policy information (step 312). The monitoring agent receives the updated configuration/policy information and stores the updated information for later use (step 314), and the update process is complete.

The process described with respect to FIG. 3 is able to trigger the update requests as required because all other outgoing network traffic would be directed to other destinations which do not trigger the monitoring agent to request a configuration/policy update.

In most cases, the monitoring agent triggers on a URI in an outgoing transaction. (In a manner that is well known in the art, hostname resolution may be performed on URLs or URIs to map the hostname to an IP address at some point in the routing process.) In HTTPS transactions, since the traffic is encrypted, the specific site and URI information is masked. In this case or in various other situations, the agent may trigger on all operations to the management server based on its IP address/addresses, i.e. by matching an IP address of the management server stored in the configuration/policy file with the destination IP address in an outgoing transaction. Although a process that triggers on all operations to the management server generates more requests to the management server for the updated configuration/policy information than would merely triggering on a single URI, the triggering mechanism is still much more efficient than the prior art polling mechanism. The monitoring agent may also scan other types of transactions using other protocols, such as Simple Mail Transfer Protocol (SMTP).

Although the monitoring agent may "learn" the identifiers for a specific destination for configuration/policy requests in a variety of manners, the destination identifiers for the configuration/policy requests are preferably stored in the configuration/policy file associated with the monitoring agent at the time that the monitoring agent is installed or initially configured on the client machine. Alternatively, the destination identifiers for the configuration/policy requests may be hard-coded into specific monitoring agents.

For example, most Internet traffic from a client may be requests to visit publicly available Web sites, such as www.cnn.com. At times, a user at the client may request to access an electronic service provided by management server, which may require the user to authenticate to a particular Web site, such as machineX.tivoli.com. Under standard operations, the monitoring agent determines whether the client receives a response from the server for each request and also determines the response time from the management server to the client's requests. In this manner, the monitoring agent generates availability and performance data that is stored in a specified log file.

However, when the user desires to update the configuration/policy information for a particular client, the user may submit a POST request to a particular destination, such as machineX.tivoli.com/newconfig.html. This particular URL may be stored in the configuration/policy file such that when the monitoring agent detects this particular URL in the sniffed data traffic and also detects that the URL matches the special URL previously stored in the configuration/policy file, the monitoring agent is triggered to request a configuration/policy update.

In the preferred embodiment, the monitoring agent does not merely copy the configuration/policy information in an outgoing POST request that has been detected to be directed to a special URL or IP address and then assume that a request to the management server is unnecessary. Although the monitoring agent is able to sniff all data traffic being sent from the client machine, and although some of the information received by the monitoring agent from the management server in the configuration/policy update may be identical to the information submitted by the user when the update was initiated, the monitoring agent is generally still required to send a request to the management server. The management server may send other information or additional information to the monitoring agent or may send the changed information in a special format required by the monitoring agent. It should be noted that any information sent by the management server to the monitoring agent is in response to a request initiated by the monitoring agent.

Figure 4:
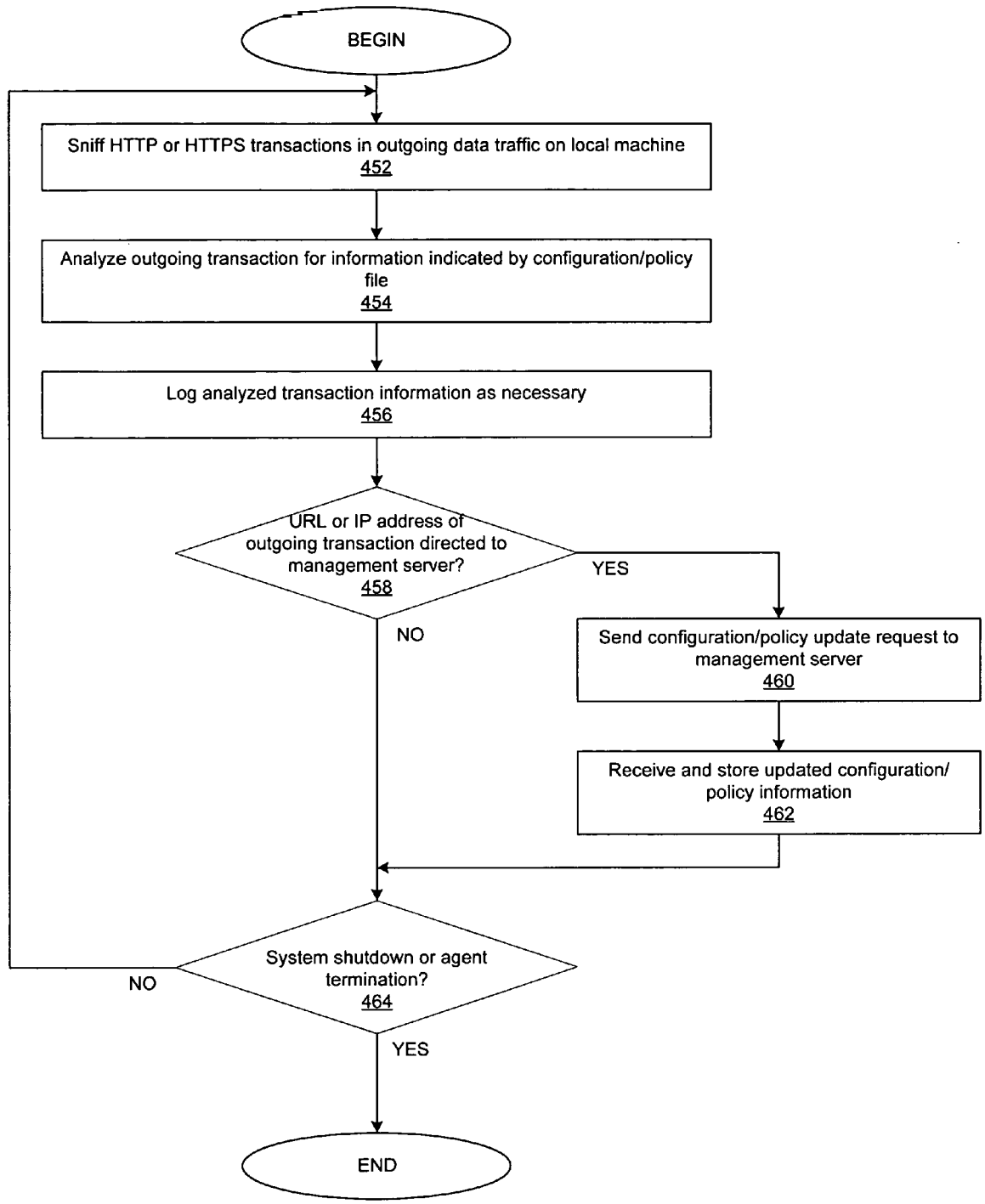
FIG. 4 is a flowchart depicting the triggering method or mechanism for sending configuration/policy update requests from a monitoring agent to a management server in accordance with a preferred embodiment of the present invention.

With reference now to FIG. 4, a flowchart depicts the triggering method or mechanism for sending configuration/policy update requests from a monitoring agent to a management server in accordance with a preferred embodiment of the present invention. Although FIG. 4 is similar to FIG. 3, FIG. 4 depicts the processing within the monitoring agent, whereas FIG. 3 depicts the overall process within the client.

The process shown in FIG. 4 is essentially a non-ending loop that may be terminated when the monitoring agent is killed or the system is shutdown. The process begins with the monitoring agent sniffing the outgoing HTTP or HTTPS transactions (step 452). The monitoring agent analyzes the outgoing transaction for information as required by the configuration/policy file (step 454). The monitoring agent then logs the analyzed transaction information as necessary (step 456).

A determination is then made as to whether the outgoing transaction is directed to a particular destination within the control of the management server, e.g., a URL or URI or an IP address for receiving configuration/policy updates from clients, such that the monitoring agent should be triggered to request a configuration/policy update from the management server (step 458). If so, the monitoring agent sends a configuration/policy update request to the management server (step 460). The monitoring agent then receives and stores the updated configuration/policy information in a predetermined location (step 462), and the process continues. If the outgoing transaction is not directed to a previously specified destination, then the process merely continues. It should be noted that the monitoring agent can be configured so that it does not stall until the updated information is received; the agent may continue filtering the outgoing data, i.e. may continue the processing loop, while waiting for the management server to send the updated information.

A determination is then made as to whether the monitoring agent should discontinue its monitoring duties, e.g., when the system is being shutdown (step 464). If not, then the process loops back to step 452 to repeat the process. If so, then the process is complete.

The advantages of the present invention should be apparent in view of the detailed description of the invention that is provided above. The monitoring agent is no longer required to poll the management server for configuration/policy updates, which is inefficient and allows for a potentially large time lag between the time that the change is initiated and the time that the change is effected.

Instead, the monitoring is triggered to request configuration/policy updates by detecting the submission of information to particular destination URLs/URIs or IP addresses. Once the monitoring agent knows that a user at the client machine has submitted an update to the management server, the monitoring agent then requests the needed information from the management server. This particular mechanism is particularly advantageous because the time lag between the submission of an update from the client and the receipt of a configuration/policy update at the monitoring agent on the client is reduced to the shortest possible amount of time as the updated information is requested by the monitoring agent immediately after the update is initiated by the user.

It is important to note that while the present invention has been described in the context of a fully functioning data processing system, those of ordinary skill in the art will appreciate that the processes of the present invention are capable of being distributed in the form of a computer readable medium of instructions and a variety of other forms and that the present invention applies equally regardless of the particular type of signal bearing media actually used to carry out the distribution. Examples of computer readable media include media such as EPROM, ROM, tape, paper, floppy disc, hard disk drive, RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for updating operational parameters of a monitoring agent on a client in a distributed data processing system, the monitoring agent monitoring characteristics of at least one application executing on a server in the distributed data processing system, the method comprising the steps of:

filtering, by the monitoring agent, network data from the client to the server; determining, by the monitoring agent, whether an outgoing transaction in the network data is addressed such that an application on the server receives the outgoing transaction as a request to change the operational parameters of the monitoring agent; and in response to a positive determination that the outgoing transaction is addressed such that an application on the server receives the outgoing transaction as a request to change the operational parameters of the monitoring agent, sending a request from the monitoring agent to the server to send to the monitoring agent an update of the operational parameters of the monitoring agent;

receiving, at the monitoring agent, the update of the operational parameters of the monitoring agent; and storing updated operational parameters on the client in a manner accessible to the monitoring agent.

2. The method of claim 1 further comprising:

parsing the outgoing transaction for a Uniform Resource Identifier (URI);

matching the URI with a URI stored as an operational parameter of the monitoring agent on the client; and providing an indication that the outgoing transaction is addressed such that the server receives the outgoing transaction as a request to change the operational parameters of the monitoring agent.

3. The method of claim 2, wherein the URI is a Uniform Resource Locator (URL) embedded within a Hypertext Transport Protocol (HTTP) request.

4. The method of claim 1, wherein the request for an update of the operational parameters of the monitoring agent is addressed with a URI stored as an operational parameter of the monitoring agent on the client.

5. A method for updating operational parameters of a monitoring agent on a client in a distributed data processing system, the monitoring agent monitoring characteristics of at least one application executing on a server in the distributed data processing system, the method comprising the steps of:

filtering, by the monitoring agent, network data from the client to the server;

determining, by the monitoring agent, whether an outgoing transaction in the network data is addressed such that an application on the server receives the outgoing transaction; and in response to a positive determination that the outgoing transaction is addressed such that an application on the server receives the outgoing transaction, sending a request from the monitoring agent to the server to send to the monitoring agent an update of the operational parameters of the monitoring agent;

receiving, at the monitoring agent the update of the operational parameters of the monitoring agent; and storing updated operational parameters on the client in a manner accessible to the monitoring agent.

6. The method of claim 5 further comprising:

parsing the outgoing transaction for an Internet Protocol (IP) address;

matching the IP address with an IP address stored as an operational parameter of the monitoring agent on the client; and determining that the outgoing transaction is addressed such that an application on the server receives the outgoing transaction.

7. A data processing system comprising processor, memory, and a monitoring agent, the monitoring agent monitoring characteristics of at least one application executing on a server, the data processing system further comprising:

filtering means for filtering, by the monitoring agent, network data from a client to the server;

determining means for determining, by the monitoring agent, whether an outgoing transaction in the network data is addressed such that an application on the server receives the outgoing transaction as a request to change the operational parameters of the monitoring agent; and sending means for sending, in response to a positive determination that the outgoing transaction is addressed such that an application on the server receives the outgoing transaction as a request to change the operational parameters of the monitoring agent, a request from the monitoring agent to the server to send to the monitoring agent an update of the operational parameters of the monitoring agent;

receiving at the monitoring agent, the update of the operational parameters of the monitoring agent; and storing updated operational parameters on the client in a manner accessible to the monitoring agent.

8. The data processing system of claim 7 further comprising:

parsing means for parsing the outgoing transaction for a Uniform Resource Identifier (URI);

matching means for matching the URI with a URI stored as an operational parameter of the monitoring agent on the client; and providing means for providing an indication that the outgoing transaction is addressed such that the server receives the outgoing transaction as a request to change the operational parameters of the monitoring agent.

9. The data processing system of claim 8, wherein the URI is a Uniform Resource Locator (URL) embedded within a Hypertext Transport Protocol (HTTP) request.

10. The data processing system of claim 7, wherein the request for an update of the operational parameters of the monitoring agent is addressed with a URI stored as an operational parameter of the monitoring agent on the client.

11. A data processing system comprising processor, memory and a monitoring agent, the monitoring agent monitoring characteristics of at least one application executing on a server, the data processing system further comprising:

filtering means for filtering, by the monitoring agent, network data from a client to the server;

determining means for determining, by the monitoring agent, whether an outgoing transaction in the network data is addressed such that an application on the server receives the outgoing transaction; and sending means for sending, in response to a positive determination that the outgoing transaction is addressed such that an application on the server receives the outgoing transaction, a request from the monitoring agent to the server to send to the monitoring agent an update of the operational parameters of the monitoring agent;

receiving, at the monitoring agent, the update of the operational parameters of the monitoring agent; and storing updated operational parameters on the client in a manner accessible to the monitoring agent.

12. The data processing system of claim 11 further comprising:

parsing means for parsing the outgoing transaction for an Internet Protocol (IP) address;

matching means for matching the IP address with an IP address stored as an operational parameter of the monitoring agent on the client; and determining means for determining that the outgoing transaction is addressed such that an application on the server receives the outgoing transaction.

13. A computer program product on a computer storage medium for use in a data processing system for updating operational parameters of a monitoring agent on a client in the data processing system, the monitoring agent monitoring characteristics of at least one application executing on a server in the data processing system, the computer program product comprising:

instructions for filtering, by the monitoring agent, network data from the client to the server;

instructions for determining, by the monitoring agent, whether an outgoing transaction in the network data is addressed such that an application on the server receives the outgoing transaction as a request to change the operational parameters of the monitoring agent; and instructions for sending, in response to a positive determination that the outgoing transaction is addressed such that an application on the server receives the outgoing transaction as a request to change the operational parameters of the monitoring agent, a request from the monitoring agent to the server to send to the monitoring agent an update of the operational parameters of the monitoring agent;

instruction for receiving, at the monitoring agent, the update of the operational parameters of the monitoring agent; and instruction for storing updated operational parameters on the client in a manner accessible to the monitoring agent.

14. The computer program product of claim 13 further comprising:

instructions for parsing the outgoing transaction for a Uniform Resource Identifier (URI);

instructions for matching the URI with a URI stored as an operational parameter of the monitoring agent on the client; and instructions for providing an indication that the outgoing transaction is addressed such that the server receives the outgoing transaction as a request to change the operational parameters of the monitoring agent.

15. The computer program product of claim 14, wherein the URI is a Uniform Resource Locator (URL) embedded within a Hypertext Transport Protocol (HTTP) request.

16. The computer program product of claim 13, wherein the request for an update of the operational parameters of the monitoring agent is addressed with a URI stored as an operational parameter of the monitoring agent on the client.

17. A computer program product on a computer storage medium for use in a data processing system for updating operational parameters of a monitoring agent on a client in the data processing system, the monitoring agent monitoring characteristics of at least one application executing on a server in the data processing system, the computer program product comprising:

instructions for filtering, by the monitoring agent, network data from the client to the server;

instructions for determining, by the monitoring agent, whether an outgoing transaction in the network data is addressed such that an application on the server receives the outgoing transaction; and instructions for sending, in response to a positive determination that the outgoing transaction is addressed such that an application on the server receives the outgoing transaction, a request from the monitoring agent to the server to send to the monitoring agent an update of the operational parameters of the monitoring agent;

instruction for receiving, at the monitoring agent, the update of the operational parameters of the monitoring agent; and instruction for storing updated operational parameters on the client in a manner accessible to the monitoring agent.

18. The computer program product of claim 17 further comprising:

instructions for parsing the outgoing transaction for an Internet Protocol (IP) address;

instructions for matching the IP address with an IP address stored as an operational parameter of the monitoring agent on the client; and instructions for determining that the outgoing transaction is addressed such that an application on the server receives the outgoing transaction.

* * * * *

UNITED STATES PATENT AND TRADEMARK OFFICE
CERTIFICATE OF CORRECTION

PATENT NO.      : 7,580,996 B1                          Page 1 of 1
APPLICATION NO. : 09/583958
DATED           : August 25, 2009
INVENTOR(S)     : Allan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2183 days.

Signed and Sealed this

Fourteenth Day of September, 2010

David J. Kappos
*Director of the United States Patent and Trademark Office*